Aug. 16, 1966  A. R. PITKANEN  3,266,848
TRANSPORTATION SYSTEM WITH CONVEYOR MEANS
Filed April 1, 1965  3 Sheets-Sheet 1

INVENTOR
ALAN R. PITKANEN
BY C. G. Stratton
ATTORNEY

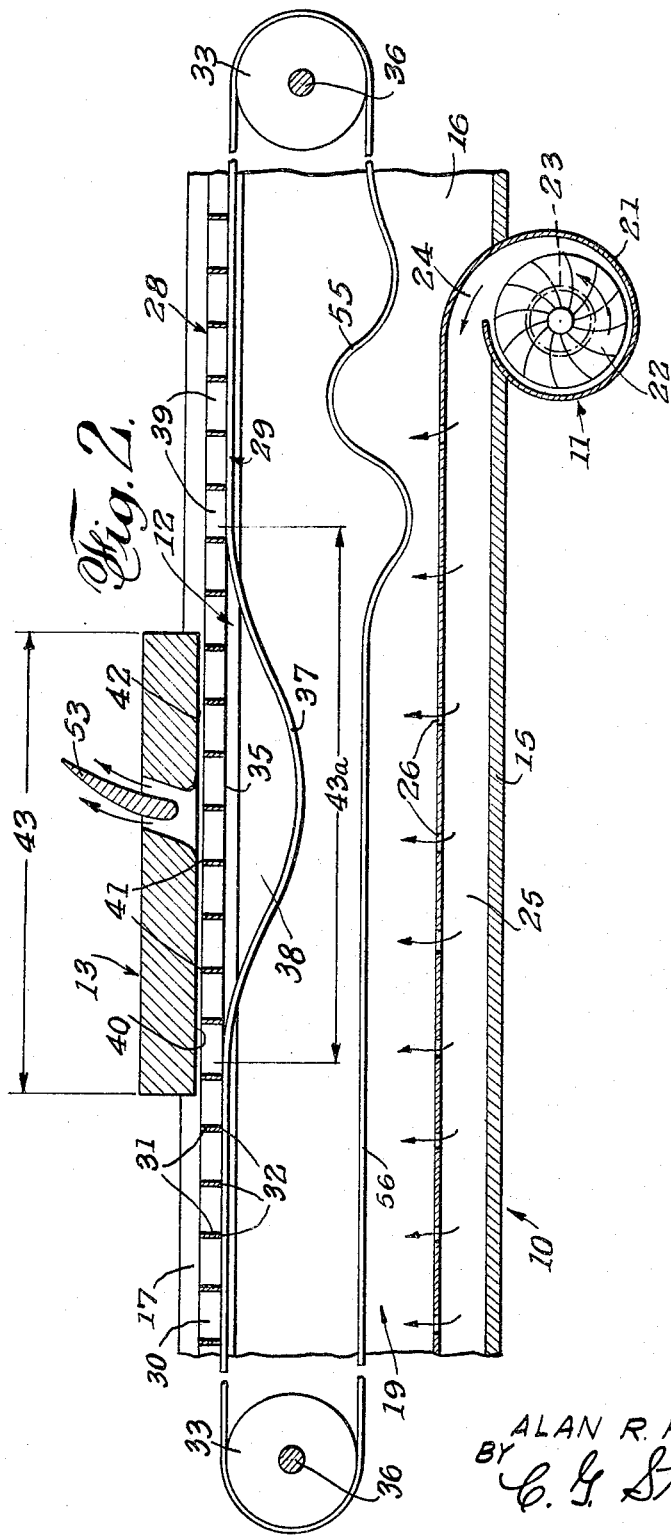

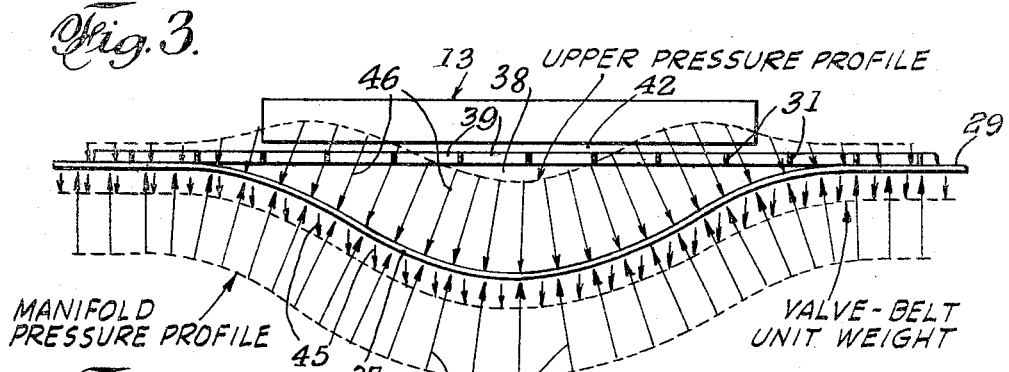
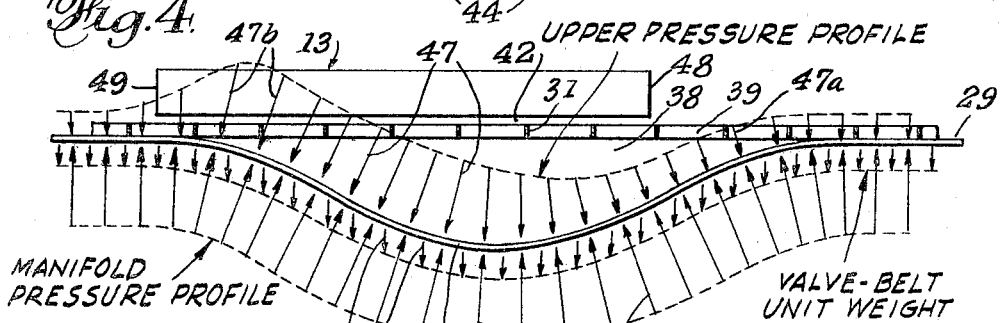
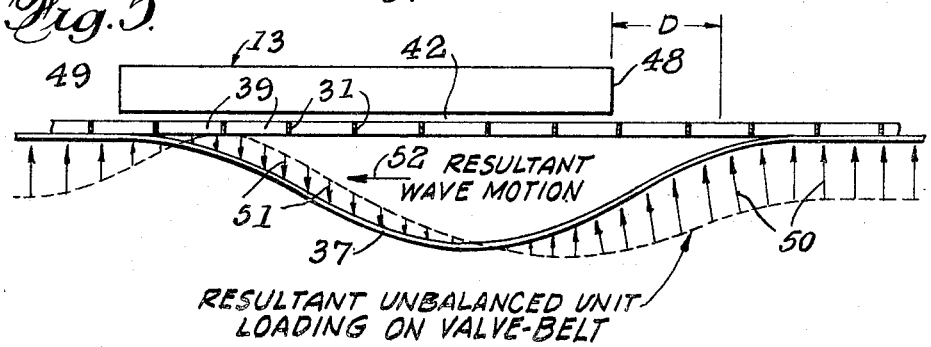

United States Patent Office 3,266,848
Patented August 16, 1966

3,266,848
TRANSPORTATION SYSTEM WITH CONVEYOR MEANS
Alan R. Pitkanen, 11044 Strathmore Drive, Westwood, Calif.
Filed Apr. 1, 1965, Ser. No. 444,543
9 Claims. (Cl. 302—29)

This invention relates to a transportation system provided with moving conveyor means for a vehicle, or other object. Broadly considered, the invention deals with the movement and distribution of articles, generally, of which vehicles are merely examples.

An object of the present invention is to provide a transportation system, as above characterized, in which the vehicle is propelled along the system while supported on a cushion of escaping compressed air that travels longitudinally, the conveyor being combined with valving means to cause such travel.

Another object of the invention is to provide a system and means, as characterized, in which the vehicle has a frictionless support while traveling and settles above the valving means upon cessation of power to the system.

A further object of the invention is to provide a transportation system in which the several vehicles being propelled thereby are spaced from each other and maintain their spacing, thereby removing the possibility of collision.

A still further object of the invention is to provide the vehicles with means subject to the pressure of escaping compressed air for propelling such vehicles.

This invention also has for its objects to provide such means that are positive in operation, convenient in use, easily installed in a working position and easily disconnected therefrom, economical of manufacture, relatively simple, and of general superiority and serviceability.

The above objects are realized in a system that comprises a roadbed for conducting a flow of compressed air, a series of stationary fans or air blowers to induce a flow of air, at low pressure, in said roadbed, traveling-wave valve means, and a vehicle supported on a cushion of said air, movable under influence of said valve means, to propel the vehicle along the roadbed.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 2 is a semi-diagrammatic longitudinal sectional view of said section.

FIGS. 3, 4 and 5 are schematic views that illustrate the principle for propelling a vehicle or other object on the apparatus shown in FIGS. 1 and 2.

Figure 1:
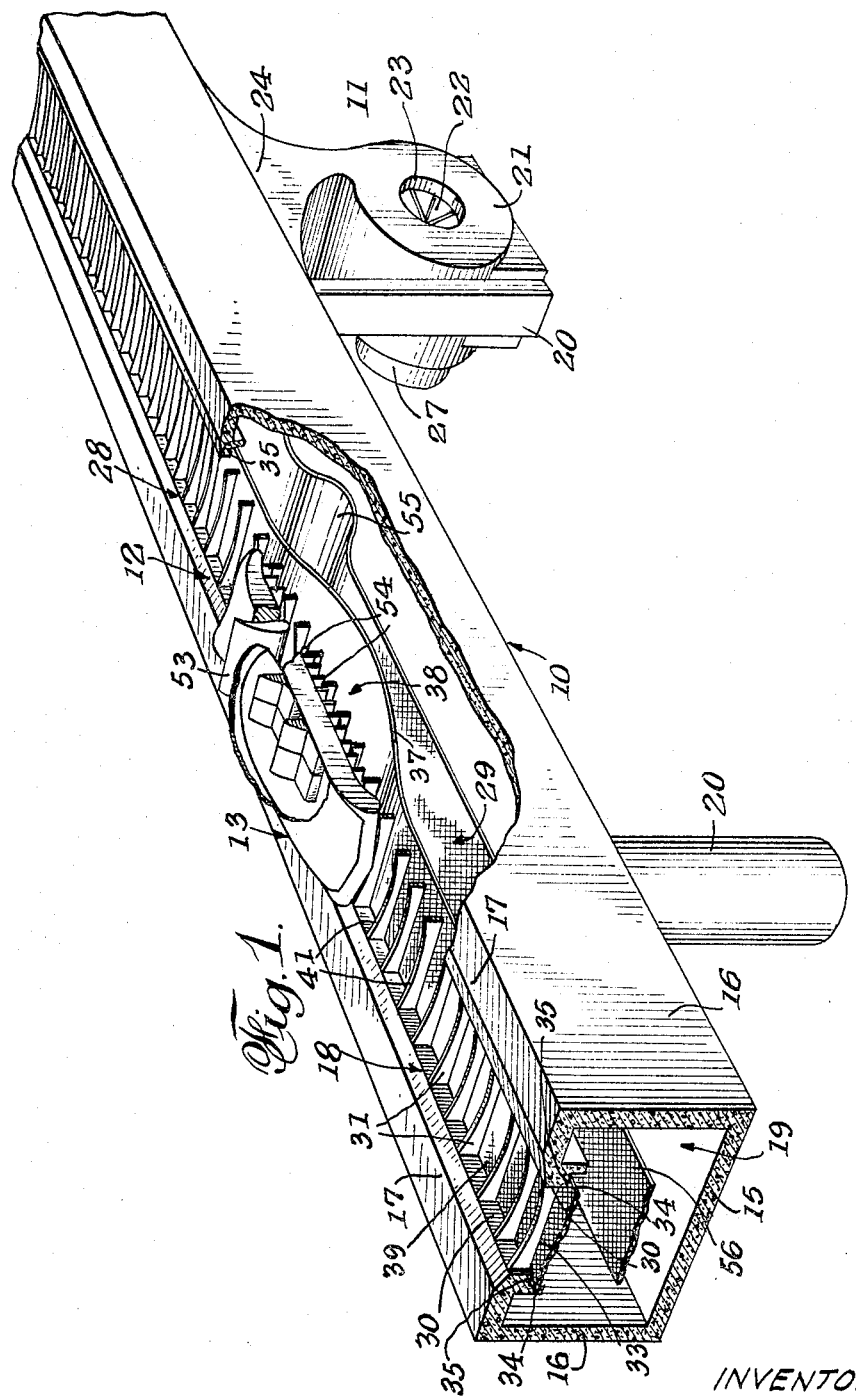
FIG. 1 is a perspective view showing a section or portion of the present transportation system, portions being broken to clarify the illustration.

The present transportation means comprises, generally, a roadbed 10, blower means 11 to induce a flow of air under relatively low pressure along said roadbed, means 12 to create a traveling-wave profile that is movable longitudinally in said roadbed, and at least one vehicle 13 above the means 12, spaced therefrom by a cushion of air escaping from the roadbed, and propelled by the means 12 longitudinally above and along the roadbed.

The roadbed 10 is shown as a U-shaped or channel structure preferably of reinforced or pre-stressed concrete. The same is shown with a bottom wall 15, side walls 16 extending upwardly from the bottom wall, and inreaching upper flange portions 17 that define a longitudinal slot or space 18. The interior 19 of said channel structure constitutes a duct. The columns 20 represent but one manner of supporting the roadbed, since an overhead support may be provided, alternatively.

The blower means 11 is shown as a single fan. In practice, as many fans as may be required are provided along the length of the roadbed. Each such fan, in usual ways, may be provided with a scroll housing 21 and an impeller 22 therewithin, to draw atmospheric air into an intake 23 and discharge the same, under pressure, through an outlet 24 into a longitudinal passage 25 having longitudinally spaced ports 26 that open in the duct 19. Power means, such as an electric motor 27, may be provided to operate the impeller 22.

The means 12 comprises a combination of the roadbed 10, a valve grating 28, a valve belt 29, and the vehicle 13. The roadbed 10, insofar as it constitutes a component of the traveling-wave valve, serves as the body of said valve, and the vehicle constitutes a component that is necessary to the operation of said valve.

As previously explained, the roadbed 10 has a longitudinal top slot or space 18 between the flange portions 17 of the channel structure of said roadbed. The valve grating 28 fits into said slot 18 and spans between and is secured to the opposite edges 30 of said portions 17. Said grating is largely open and, in this instance, is shown as a plurality of transverse members 31. As seen best in FIG. 2, the lower edges 32 of the member are coplanar.

The valve belt 29 comprises an endless pliable member that is impervious to air. The same is trained over pulleys 33 which may be longitudinally spaced, as desired, the length of the belt; provided, however, that said belt length produces slack therein. As can be seen from FIG. 1, the belt 29 is wider than the slot 18 so that its opposite marginal edges 34 not only engage against said edges 32 of the grating members 31 but also against lower coplanar faces 35 of the flange portions 17 of the valve body (the roadbed 10). The pulleys 33 are mounted to turn freely on shafts 36, each pulley turning according to the manner in which the slack is being formed. It will be understood that, with air pressure in channel 19 of a degree sufficient to support the top run of the belt 29, said run will be pressed against the grating edges 32 and into sealing engagement with the mentioned faces 34. Since the upper run of the belt, due to the slack therein, may buckle or undulate only in a direction away from said edges 32 and surfaces 34, the traveling-wave belt may be opened only by inducing such a buckling or undulation 37 of the upper run, the same causing spaces to be formed between both edges 34 of the belt and the faces 35, enabling air in the channel 19 to flow past said edges into the area 38 formed by said buckled or profile portion of the belt and through the spaces 39 between the grating members 31. The pressure supplied by the blower means 11 is maintained at a degree that avoids a complete loss of head in passage 19, the size of the area 38 being devised as to limit the escape of air so as to retain said head, which is of such degree, as before indicated that the upper run of the belt is biased into contact with the grating edges 32.

The vehicle 13 which, actually, is a slide, has an under surface 40 that generally conforms to the form of the upper edges 41 of the grating members 31, thereby minimizing the space 42 that is formed between said surface 40 and edges 41 when the vehicle is being supported on an air cushion that is formed in said space. In practice, the vehicle length 43 is arranged to be somewhat smaller than the length 43a of the wave profile 37. Disposal of the vehicle in near and overlapping relation to the wave profile, causes the wave 37 to index to a position centered with the vehicle, as shown in FIGS. 1 and 3. This is a stable position for the wave profile 37 and the same seeks to maintain this position until a displacement of the vehicle, longitudinally, will cause the wave profile to index or track it and re-establish centered, symmetrical relationship of vehicle and wave profile.

The presence of vehicle near the wave profile, sets up pressure distribution profiles similar to those schematically shown in FIGS. 3, 4 and 5. As shown in FIG. 3, the wave profile 37 is subject to manifold pressure from beneath, as created by the air in channel 19, this pressure being uniformly impressed on the belt, as indicated by the arrows 44, and being uniformly reduced by the unit weight of the valve belt, as indicated by the shorter arrows 45. The presence of the vehicle 13 in symmetrical relation to said wave profile 37 produces a uniform upper pressure profile effective on the upper face of the belt that is opposed to the resultant pressure of arrows 44 and 45. The arrows 46 indicate this symmetrical opposed pressure and show why a stable position of the wave profile results.

Upon displacement of the vehicle 13 from said symmetrical position, as indicated by the dimension D, the pressure profiles represented by the arrows are initially undisturbed, as shown in FIG. 4. However, the upper pressure profile is substantially changed to an unbalanced condition indicated by the arrows 47. This is brought about by the fact that the area 38 is open to atmosphere between the wave profile 37 and the trailing end 48 of the vehicle, while the area 38 is somewhat more constricted by the advancing end 49 of the vehicle. The shorter arrows 47a at the trailing end of the vehicle and the longer arrows 47b at the advancing end show that an unequal or non-uniform pressure on the top surface of the upper run of belt 29 result. Therefore, as indicated by the arrows 50 that represent an upwardly applied force on the wave profile 37, where the same is unopposed by any upper pressure, except atmosphere, and the arrows 51 that represent only the unit weight of the valve belt where the two pressure profiles cancel each other, the displacement D of the vehicle causes resultant unit loading and produces a wave motion according to the arrow 52.

It will be seen that the traveling-wave valve utilizes only the power needed to produce the desired pressure in the passage 19 and the input of power from the vehicle to cause movement of the wave form. As the wave form moves along the roadbed following the vehicle, successive portions of the belt move away from the valve grating 28, form the wave profile 37, and return to engagement with said grating. It will be clear that the belt does not slide but rather relocates during passage of the wave by a distance equal to the length that was added to the belt to produce the wave 37. Thus, the linear motion of the belt is intermittent and very slow, although the velocity of the vehicle along the roadbed is continuous and much higher.

As shown in FIGS. 1 and 2, the vehicle 13 may be provided with a main propulsion air foil 53 that, under pressure of escaping air beneath the vehicle, propels the vehicle in a forward direction, the wave 37 following, as above described. Auxiliary air foils 54, as in FIG. 1, may be provided on the lower part of the vehicle for use with air foil 53 or alone, as desired. Externally applied power may also be used to propel the vehicle on its cushion of escaping air. Also, the power for this purpose may be carried by a plant on the vehicle.

Since the belt 29 may be of a length to include two or more wave profiles, spaced as desired or uniformly, several vehicles or other such slide units may be moved along the upper run of the belt. The slack of wave profiles that pass over the pulley 33 toward which they travel is taken up in the lower return run to provide slack 55 in said return run 56. Such slack provides belt length that forms new wave profiles under reaction to pressure by vehicles 13, as described.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A transportation system comprising:
    (a) a longitudinal roadbed having a longitudinal passage and provided with upper, oppositely inreaching flanges that define a slot open to said passage and to atmosphere,
    (b) a grating spanning across said slot and having air-passing openings,
    (c) a flexible air-impervious belt beneath said flanges and grating, slack being provided in the longitudinal extent of the belt and forming an undulation therein,
    (d) a slide member above said grating, and
    (e) means to create air pressure in said passage which is effective to press the belt upwardly with its marginal edges at both ends of the undulation in air-sealing contact with the flanges of the roadbed,
    (f) the slide member being in the path of escape of air from the passage, around the edges of the undulated portion of the belt, and through the grating to form an escaping air cushion for said slide member, said member being static due to symmetry of pressures on both sides of the undulation.

2. A transportation system according to claim 1 provided with means to propel the slide member longitudinally, the undulation in the belt, upon movement of the slide member out of symmetrical relation with the undulation, being subject to an imbalance between the air pressure on the under side of the undulation and the unsymmetrical pressure on the upper side of the undulation to cause the undulation to follow after the slide member seeking to restore balance of pressure on the undulation and, thereby keeping the air cushion beneath the traveling slide member.

3. A transportation system according to claim 2 in which the slide member is provided with means that is subject to the pressure of the escaping air to propel the vehicle.

4. A transporting system comprising:
    (a) a flexible belt having slack therein that forms a wave form in the belt between straight portions of the belt,
    (b) a grating above said belt,
    (c) air-pressure means biasing said straight portions of the belt into air-intercepting engagement with the grating while pressure air is passing around the edges of the belt and through the grating, and
    (d) a slide member above the grating and supported by said pressure air,
    (e) the wave form of the belt, upon longitudinal displacement of the slide member following the movement of said displacement,
    (f) the pressures on opposite faces of the wave form becoming unbalanced due to the symmetry of opposed pressures being disturbed by such slide member movement.

5. A transporting system comprising:
    (a) a flexible belt having slack therein that forms a wave form in the belt between straight portions of the belt,
    (b) a grating above said belt,
    (c) air-pressure means biasing said straight portions of the belt into air-intercepting engagement with the grating while pressure air is passing around the edges of the belt and through the grating, and (d) a slide member above the grating and supported by said pressure air, (e) the pressure loading on opposite sides of the wave form being symmetrical when the slide member is symmetrically located relative to said wave form, (f) said pressure loading becoming unbalanced upon displacement of the slide member longitudinally and producing unbalanced unit loading on the wave form, (g) said wave form following the movement of the slide member seeking to restore the symmetrical pressure loading and, thereby, keeping supporting air pressure beneath the moving slide member.

6. A transporting system according to claim 5 provided with means to propel the slide member longitudinally.

7. A transporting system according to claim 6 in which the slide member is provided with means that is subject to the pressure of the escaping air to propel the vehicle.

8. In a conveyor system having a slide member, means to support said member on a traveling air cushion, said means including:

(a) a flexible belt having slack therein, (b) means producing air pressure that forms said belt into a bulging wave form between two straight belt portions, and (c) a grating between said belt and the slide member against which the air pressure presses the straight portions of the belt, said grating passing pressure air that passes around the longitudinal edges of the wave form of the belt to form said cushion.

9. In a conveyor system according to claim 8 in which, upon longitudinal movement of the slide member, said wave form follows to retain said air cushion beneath the slide member.

References Cited by the Examiner
UNITED STATES PATENTS

| | | | |
|---|---|---|---|
| 756,600 | 4/1904 | Dodge | 302—31 |
| 3,087,602 | 4/1963 | Hinkle | 198—220 |
| 3,127,007 | 3/1964 | Smith | 271—74 |
| 3,194,333 | 7/1965 | Cockerell | 180—7 |

EVON C. BLUNK, *Primary Examiner.*

A. H. NIELSEN, *Assistant Examiner.*